US009015296B2

(12) United States Patent
Mattila et al.

(10) Patent No.: US 9,015,296 B2
(45) Date of Patent: Apr. 21, 2015

(54) METHOD OF MANAGING NETWORK ELEMENT SETTINGS

(75) Inventors: Mika Mattila, Tampere (FI); Kimmo Saarinen, Tampere (FI); Kari Silfverberg, Tampere (FI)

(73) Assignee: Nokia Solutions and Networks Oy, Espoo (FI)

( * ) Notice: Subject to any disclaimer, the term of this patent is extended or adjusted under 35 U.S.C. 154(b) by 2327 days.

(21) Appl. No.: 10/399,613

(22) PCT Filed: Oct. 18, 2001

(86) PCT No.: PCT/FI01/00907

§ 371 (c)(1),
(2), (4) Date: Aug. 25, 2003

(87) PCT Pub. No.: WO02/33900

PCT Pub. Date: Apr. 25, 2002

(65) Prior Publication Data

US 2004/0049566 A1 Mar. 11, 2004

(30) Foreign Application Priority Data

Oct. 19, 2000 (FI) ..................................... 20002311

(51) Int. Cl.
*G06F 15/173* (2006.01)
*H04L 12/24* (2006.01)

(52) U.S. Cl.
CPC .......... *H04L 41/0233* (2013.01); *H04L 41/024* (2013.01)

(58) Field of Classification Search
USPC ......... 709/203, 208, 209, 213, 220, 221, 223, 709/224, 250; 710/1, 8, 10; 713/1, 100; 717/168; 718/100; 719/313, 317
See application file for complete search history.

(56) References Cited

U.S. PATENT DOCUMENTS 5,751,963 A 5/1998 Umetsu
5,996,010 A 11/1999 Leong et al.

(Continued)

FOREIGN PATENT DOCUMENTS

EP 1 107 108 A1 6/2001
GB 2 320 115 6/1998

(Continued)

OTHER PUBLICATIONS

W3C, "Extensible Markup Language (XML) 1.0", Bray et al, REC-sml-19980210, W3C Recommendation, Feb. 10, 1998, pp. 1-32. http://www.w3.org/TR/REC-xml.

(Continued)

*Primary Examiner* — Scott B Christensen
(74) *Attorney, Agent, or Firm* — Squire Patton Boggs (US) LLP

(57) ABSTRACT

The invention relates to a method of managing network element (NE) settings in a communications network. The invention comprises defining a proxy (AC) for the network element (NE) to be managed; loading information on the present settings of said network element (NE) to said proxy (AC); loading information on the new settings of said network element (NE) to said proxy (AC); comparing the new settings of the network element (NE) with its present settings in the proxy (AC); and if the new settings of the network element (NE) differ from its present settings, generating management operations in the proxy (AC) for replacing the present settings with the new settings in the network element (NE); and updating the new settings to the network element (NE) by means of said management operations at the moment determined by the network management element.

26 Claims, 2 Drawing Sheets

(56) References Cited

U.S. PATENT DOCUMENTS

| | | | | |
|---|---|---|---|---|
| 6,041,350 | A | 3/2000 | Takimoto | |
| 6,049,819 | A | 4/2000 | Buckle et al. | |
| 6,061,729 | A | 5/2000 | Nightingale | |
| 6,466,971 | B1 * | 10/2002 | Humpleman et al. | 709/220 |
| 6,539,431 | B1 * | 3/2003 | Sitaraman et al. | 709/226 |
| 6,584,507 | B1 * | 6/2003 | Bradley et al. | 709/229 |
| 6,714,992 | B1 * | 3/2004 | Kanojia et al. | 719/321 |
| 7,054,924 | B1 * | 5/2006 | Harvey et al. | 709/220 |

FOREIGN PATENT DOCUMENTS

| | | |
|---|---|---|
| JP | 2000-253000 | 9/2000 |
| WO | WO 98/47057 | * 10/1998 |
| WO | WO 99/57649 | 11/1999 |

OTHER PUBLICATIONS

The Common Object Request Broker: Architecture and Specification (CORBA). Revision 2.2, Feb. 1998. Object Management Group Inc.

* cited by examiner

METHOD OF MANAGING NETWORK ELEMENT SETTINGS

BACKGROUND OF THE INVENTION

The invention relates to a method of managing network element settings in a communications network.

FIG. 1 illustrates management of network element NE settings according to the prior art. In this method, a network management element MaS (Management System) collects 1-20 the desired information, e.g. settings of a digital exchange, from the target system DX (digital exchange) of the network element via a man machine interface MMI and changes 1-10 the information of the target system, e.g. the settings, in response to the information received from the target system. According to the prior art, the network management element MaS has a direct connection 1-10, 1-20 to the target system DX of the network element.

The problem related to the prior art arrangement described above is that the management of network element settings puts unnecessary load on the telecommunications network as data are transferred between the network management element and the network element. Furthermore, the network management system or the operator has to know the configuration operations required by each network element.

BRIEF DESCRIPTION OF THE INVENTION

An object of the invention is to provide a method and an apparatus implementing the method to eliminate the above-mentioned problem. The object of the invention is achieved with a method, proxy, network management system and network element, which are characterized by what is disclosed in the independent claims. The dependent claims disclose the preferred embodiments of the invention.

The invention is based on managing network element settings with a proxy which is provided for the network element and determines and performs, on the basis of a configuration plan provided by the network management system, the operations needed to change the network element settings to conform to the configuration plan. The configuration plan generally refers to settings, which have been planned for the network element or are to be updated at once or later at the moment determined by the network management system, i.e. the operator. In a first preferred embodiment of the invention the network management system initiates transmission of the configuration plan to the network element. The plan is compared with the present configuration, which is stored in the proxy or loaded to it from the network element. Typically the plan and the present settings differ from each other. In a first embodiment of the invention the proxy determines the difference between the plan and the present settings by means of database operations. The proxy uses the difference determined for generating the network element operations needed to update the present settings to conform to the plan.

Thanks to the invention, the network management system does not need to know what kind of logic is needed to change the settings in the target system, i.e. the network element, or what operations are needed and how they are employed. The invention hides the target system-specific control interface from the network management system and allows the network management system to use a generic configuration plan. The database-based solution simplifies generation of differences (between the plan and the present settings), enables automatic generation of operation commands of the target system and allows modification of functionality through external configuration files, i.e. no changes are needed in the software.

According to an embodiment of the invention, an XML-structured (Extensible Markup Language) document is used for defining new settings data. This provides the advantage that the structure of the document in question is easy to analyse and comparison of the new and the present settings data is simple.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
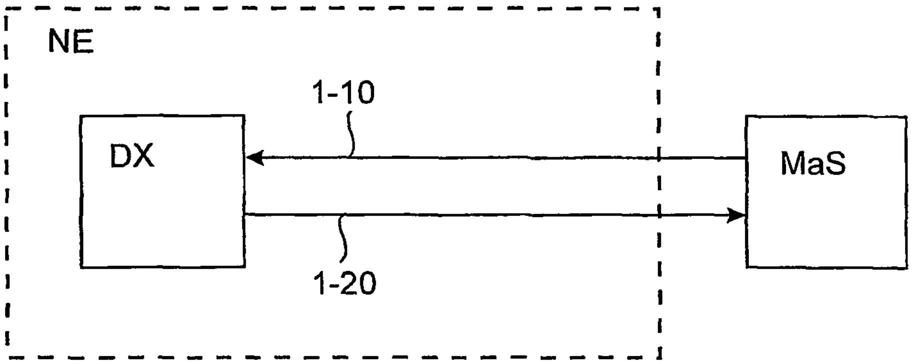
FIG. 1 illustrates management of network element settings according to the prior art.
Figure 2:
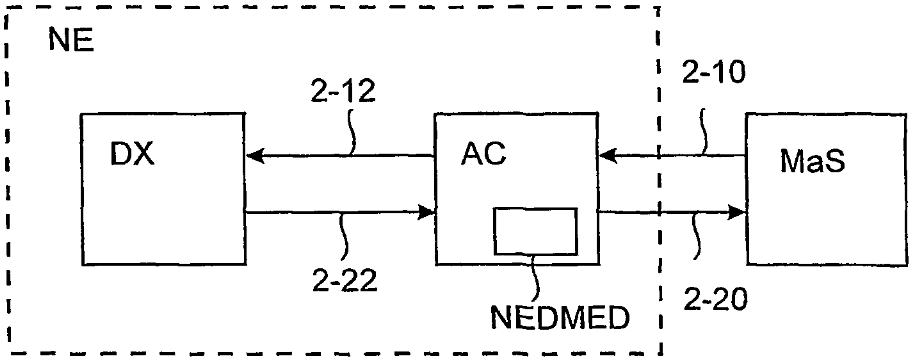
FIG. 2 illustrates management of network element settings according to the invention.

FIG. 2 illustrates management of network element settings according to the invention. There is a proxy provided for the target system DX of the network element NE to be managed, the proxy being denoted by reference symbol AC (Adjunct Computer). The proxy is defined so that the planned settings (configuration plan) can be downloaded 2-10, 2-12 from the network management element MaS to it as well as the present settings (present configuration) of the target device DX of the network element (e.g. a telephone exchange) uploaded to MaS. In some systems the proxy AC can be a process entity as a part of the network element to be managed.

In the network management system or centre there is a picture of the configurations of the network elements of the entire network. The configuration information includes information on topology, busses, load situation etc. If the configuration of one network element is changed, also the other parts of the network are changed. Normally the operator has different reasons—like a new network element, optimisation of a network element or traffic, or different campaigns—to change the configuration of the network. When the configuration is wanted to change, the plan for a network element is done according to the picture of the whole network, which plan fulfils the changes of the configuration of the network. The configuration plan can comprise e.g. parameters related to the routing of the signalling, number analysis, call control, invoicing and services.

As mentioned above, the changes of the configuration of the entire network can affect the configuration of single network elements. If e.g. charging parameters bound to certain time changes to another time, charging parameters may have to be updated to each network element. Also the integration of a new network element to the network can change the network topology. For this reason the network elements to which this new network element is connected, can be updated in respect of routing e.g. Also due to the increase of the traffic the network can be optimised.

The settings data to be fed from the network management element MaS into the proxy AC can be defined as an XML (Extensible Markup Language) structure, for example, in which case the structure is simple to analyse. In the following there are shown example of an old configuration and a new configuration in XML alike presentation format:

OLD CONFIGURATION

```
<DIGIT ANALYSES>
<ANALYSIS
DIGITS="123" DEST="1">
</ANALYSIS>
<ANALYSIS
DIGITS="234" DEST="2">
</ANALYSIS>
...
</DIGIT ANALYSES>
...
<DESTINATIONS>
<DESTINATION
DEST="1",ROUTES="1,2,3">
</DESTINATION>
...
</DESTINATIONS>
...
<ROUTES>
<ROUTE
ROUTE="1",CIRCUIT GROUPS="1,2,3">
</ROUTE>
<ROUTE
ROUTE="2",CIRCUIT GROUPS="4,5,6">
</ROUTE>
...
</ROUTES>
```

NEW CONFIGURATION

```
<DIGIT ANALYSES>
<ANALYSIS
DIGITS="123",DEST="1">
</ANALYSIS>
<!-- DELETED1
<ANALYSIS
DIGITS="234",DEST="2">
</ANALYSIS>-->
...
<ANALYSIS <!-- NEW1 -->
DIGITS="456",DEST="3"> <!-- NEW1 -->
</ANALYSIS> <!-- NEW1 --
...
</DIGIT ANALYSES>
...
<DESTINATIONS>
<DESTINATION
DEST="1",ROUTES="1,2,3">
</DESTINATION>
...
<DESTINATION <!-- NEW2 --->
DEST="3",ROUTES="4,5,6"> <!-- NEW2 --->
</DESTINATION> <!-- NEW2 --->
...
</DESTINATIONS>
...
<ROUTES>
<ROUTE
ROUTE="1",CIRCUIT GROUPS="1,2,3">
<ROUTE>
<ROUTE
ROUTE="2",CIRCUIT GROUPS="4,5,6">
</ROUTE>
...
</ROUTES>
```

The XML language is defined in the following standard: World Wide Web Consortium (W3C) W3C Recommendation (Extensible Markup language (XML) 1.0, W3C Recommendation 10-February-1998, REC-xml-19980210, http://www.w3.org/TR/REC.-xml).

The following rules can now be used to produce the commands changing the configuration in DX. These commands are executed in the later phase of the activation process.

DIFFERENCE RULES:
FOR EACH NEW ANALYSIS DETECTED
X:=DIGITS,Y:=DEST
COMMANDS TO BE ISSUED:
CREATE DIGIT ANALYSIS DIGITS=X,DEST=Y
FOR EACH ANALYSIS DELETION DETECTED
X:=DIGITS
COMMANDS ISSUED:
DELETE DIGIT ANALYSIS DIGITS=X

The configuration plan can be thought as a description about all the elements and their values of the certain part of the configuration in the network element. This means that the elements to be deleted are not within the new configuration; the elements to be changed to a new value differentiate from the old elements only by the value of the element; and the elements to be added are not presented in the old configuration. An alternative way of presenting the changes of a configuration is to include operands like add, delete and set to a configuration plan, the operands being connected to the element.

The configuration plan can be based on a structural document, in which the structure of the document can describe the structure of the entities to be managed from the network element. The syntax of the document can be XML.

The configuration plan of a network element can be transferred to the proxy AC by calling an API call of the NEDMED (Network Element Data Mediator). After that MaS requests NEDMED by the corresponding NEDMED API call for either validate or active the plan or the plan which is already in the network element. NEDMED retrieves the current configuration from the DX, transfers the XML type plan into an inner database format and validates and checks whether the plan can be executed. This happens with the help of the database operations by comparing the plan and the DX configuration and by interpreting the result of that comparison.

The configuration plan can be based on a structural document as mentioned above. From this document a memory database structure can be created and a comparable database structure or database can be created from the memory database structure.

In activation, after the present settings from the network element and the new settings of the network element NE have been loaded to the proxy AC and validated, the proxy AC compares the new settings with the present settings of the network element NE. For each detected difference the proxy AC generates a management operation, which is used for synchronizing the present configuration of the network element NE with the new configuration loaded from the network management element MaS. The settings data can be synchronized and updated e.g. at the moment determined by the network management element MaS.

In a preferred embodiment of the invention the configuration of the network element is uploaded to the element AC.

In another preferred embodiment of the invention the configuration of the network element is uploaded to the element AC so that a database is parsed from the print produced by a command user interface.

In another preferred embodiment of the invention the data on the present settings of said network element is uploaded from the network element to said proxy so that the database structure provided by the network element for the configuration data is converted into an inner format of the proxy AC in the proxy AC.

In still another preferred embodiment of the invention the data on the present settings of said network element (NE) is uploaded from the network element (NE) to said proxy (AC)

so that the database structure provided by the network element for the configuration data is converted into an comparable database structure.

In another preferred embodiment of the invention the uploading can be due to a single session or due to more than a one sessions or request operations.

In the proxy an XML document can be converted into the internal form of database structure used in the proxy AC. This conversion can be done e.g. with the help of a macro which guides a parser first to parse XML formatted plans to memory object according to a schema, second to read the data (the database structure) parameter by parameter from the memory object and third to combine the data with SQL (Structured Query Language)—sentences. The SQL-sentences are then executed resulting the data being stored to a plan table.

The conversion of the current settings of the network element can also be done e.g. with the help of a macro. In this case the macro guides a second parser first to parse the current configuration fetched from the network element to memory object according to a specific Object Instantation Language, second to read the data (the database structure) parameter by parameter from the memory object and third to combine the data with SQL-sentences. The SQL-sentences are then executed resulting the data being stored to a second plan table. In other words the settings data of the network element's target system DX are also converted into the internal form of database structure used in the proxy AC. Finally there are both the configuration plan and the present configuration stored in the database of the proxy. Thus the difference between these two configurations can be generated by means of database operations.

After creating relational databases of the plan and the current configuration the database combines information therefrom and a difference table thereof is constructed by comparing the rows of those two tables. Finally instructions are generated from the differences and the instructions are used to produce commands for changing or replacing the old configuration with a new one. The management interface between the network management element MaS and the proxy AC may be a CORBA-type (Common Object Request Broker Architecture) interface completed with FTP (file transfer protocol) for file transfer, whereas the interface between the target system DX to be managed and the proxy AC is typically an MML interface. The CORBA interface is used for initiating, controlling and reporting the progress of the loading the (present) settings from the proxy AC to the network management element MaS and vice versa where the file format is XML and the file transfer is done with file transfer protocol FTP. The CORBA is defined in the following standard: CORBA, The Common Object Request Broker: Architecture and Specification. Revision 2.2, February 1998. Object Management Group, Inc.

Management of the network element settings can be divided into two parts: on uploading the settings data from the proxy AC to the network management element MaS (reference 2-20 in FIG. 2), the network management element requests settings data from the proxy via the CORBA interface. In that case the proxy AC first generates an XML file including the settings data and then responds to the request by the network management element MaS using the methods defined in the API.

When the settings data are downloaded from the network management element MaS to the proxy AC (reference 2-12 in FIG. 2), the proxy transfers a configuration plan including the settings requested to itself. Before the settings data are activated, a NEDMED block validates and confirms the concept e.g. by checking that the given adjustments are possible to carry into effect, by checking that the values of the adjustments are within predetermined limits and by checking that the adjustments concern existing objects. When the network management element MaS requests concept activation, the proxy AC performs the necessary operations to generate the requested settings.

Figure 3:
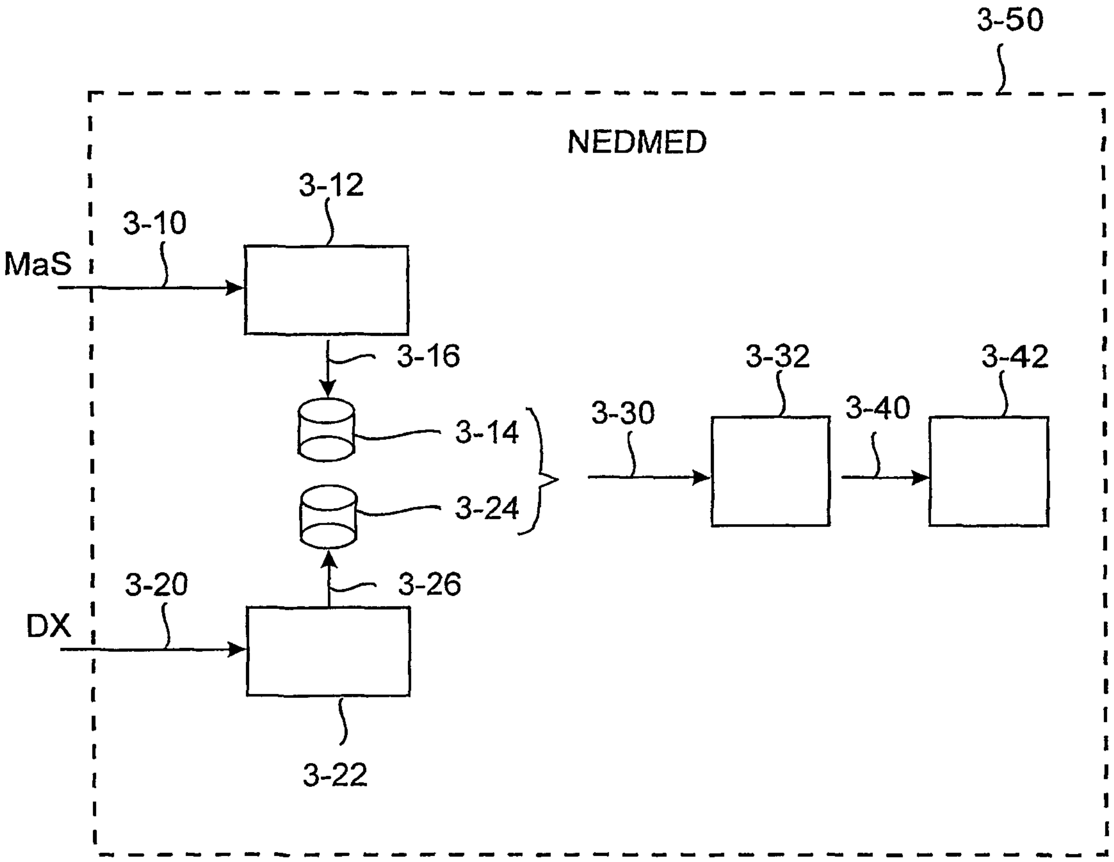
FIG. 3 illustrates a NEDMED block and its function.

FIG. 3 illustrates in greater detail a NEDMED block located in the proxy AC and its function. There is a connection 3-10 from the network management element 3-12 to the NEDMED block 3-50 of the proxy instead of the target system DX. The XML file including the new settings data can be converted in element 3-12 into an internal database structure, which can be inserted 3-16 into a database 3-14 connected to the element 3-12. Correspondingly, there is a connection 3-20 from the network element DX to the NEDMED block 3-50 of the proxy instead of a direct connection of the network management element. The file including the present settings data can be converted in element 3-22 into an internal database structure, which can be inserted 3-26 into a database 3-24 connected to the element 3-22. Management operations 3-30, 3-32, 3-40 and 3-42 for changing the settings of the network element and the target system are generated from the comparison results of the new and the present settings.

The use of the NEDMED concept provides an application program interface API e.g. for managing the network element settings. The API interface is built on top of the CORBA interface and the XML data format is used for file-based data transmission.

The configuration of the NEDMED block of the proxy can be changed; for example, new features implementing new functionality can be added to it by means of external configuration files without making changes to the NEDMED block itself.

The invention and its embodiments improve the function of a communications system because management of network element settings no longer puts unnecessary load on the communications system e.g. thanks to the fact that the network management element does not need to know what kind of logic is used for changing the target system settings or what operations are needed in the comparison and conversion process and/or how these are employed: the invention and its embodiments hide the typical control interface of the target system from the network management element, e.g. the operator, i.e. they hide the information on how the settings are made to conform to each other. This means that the load on the communications network decreases because the need for communication between the network management element and the network element decreases. Thus the logic of the changes in the target system's settings and the operations needed to perform these are hidden by increasing the abstraction level.

Using the database structure and database operations the difference between the new and the present settings of the network element's target system can be found out in a simple manner. These differences are used for generating target system operations to convert the present settings into the new settings. Furthermore, operation commands of the target system can be generated automatically, and the functionality of the network element's target system can be modified with external configuration files and thus no changes are needed in the software.

It is obvious to a person skilled in the art that as the technology advances, the basic idea of the invention can be implemented in various ways. The invention and its embodiments are thus not limited to the examples described above, but may be modified within the scope of the claims.

The invention claimed is:

1. A method, comprising:

managing network element settings with a proxy which is provided for at least one network element in a communications system comprising said at least one network element and a network management system separate from said at least one network element wherein the communication between the network management system and the network element is performed over a telecommunication network;

determining and performing by the proxy, based on a configuration plan containing settings for the at least one network element provided by the network management system, the operations needed to change the network element settings to conform to the configuration plan containing settings;

comparing the settings according to the plan with present settings of the at least one network element in the proxy; and when the settings according to the plan differ from the present settings of the at least one network element, generating management operations in the proxy to update the network element settings to conform to the configuration plan.

2. A method according to claim 1, wherein said method further comprises:

defining a proxy for the at least one network element to be managed;

downloading data on the present settings of said at least one network element from the at least one network element to said proxy;

downloading a plan for the settings of said at least one network element from the network management system to said proxy; and updating the network element settings using said management operations.

3. A method according to claim 2, wherein said update is performed at a moment determined by the network management system.

4. A method according to claim 1, wherein the present settings and the configuration plan containing settings are database structures and that the difference between the present settings and the plan and the operations needed to change the configuration of the at least one network element are determined by database operations.

5. A method according to claim 1, wherein the configuration plan containing settings is based on a structural document.

6. A method according to claim 5, wherein the structure of the document describes the structure of the entities to be managed from the at least one network element.

7. A method according to claim 5, wherein the language of the document is XML.

8. A method according to claim 5, wherein a memory database structure is created from the configuration plan containing settings.

9. A method according to claim 8, wherein a database structure or database, which is able to be compared, is created from the memory database structure.

10. A method according to claim 2, wherein the configuration of the at least one network element is uploaded to the proxy.

11. A method according to claim 2, wherein the configuration of the at least one network element is uploaded to the proxy so that a database is parsed from the print produced by a command user interface.

12. A method according to claim 2, wherein the data on the present settings of said at least one network element is uploaded from the at least one network element to said proxy so that the database structure provided by the at least one network element for the configuration data is converted into an inner format of the proxy in the proxy.

13. A method according to claim 2, wherein the data on the present settings of said at least one network element is uploaded from the at least one network element to said proxy so that the database structure provided by the at least one network element for the configuration data is converted into a database structure, which is able to be compared.

14. A method according to claim 1, wherein the uploading can be due to a single session or due to more than a one sessions or request operations.

15. A method according to claim 1, wherein the proxy is a part of the at least one network element to be managed.

16. An apparatus, comprising:

hardware or a combination of software and hardware configured to manage network element settings in a communications system comprising at least one network element and a network management system separate from the at least one network element, wherein the communication between the network management system and the network element is performed over a telecommunications network; and a mediator configured to determine operations needed to change the network element settings to conform to a configuration plan containing settings, for the at least one network element, received from the network management system, configured to compare the settings according to the plan with present settings of the at least one network element, and, when the settings according to the plan differ from the present settings of the at least one network element, configured to generate management operations to update the network element settings to conform to the configuration plan.

17. An apparatus according to claim 16, wherein the apparatus is a proxy unit adjunct computer configured to perform the determined operations in response to an activation process by the network management system.

18. An apparatus according to claim 16, wherein the apparatus is a proxy unit adjunct computer that is part of the at least one network element to be managed.

19. A system, comprising:

at least one network element comprising a proxy unit adjunct computer;

a telecommunications network; and a centralized network management unit configured to manage the at least one network element of a plurality of communication systems and being separate from the at least one network element, wherein the communication between the centralized network management unit and the network element is performed over the telecommunications network, and wherein the proxy unit adjunct computer is configured to determine and perform, based on a configuration plan containing settings for the at least one network element, provided by the system, operations needed to change the network element settings to conform to the configuration plan containing settings, and wherein the proxy unit adjunct computer further comprises a comparing unit configured to compare the settings according to the configuration plan of the at least one network element with its present settings, and a generating unit configured to generate management operations to update the network element settings to conform to the configuration plan containing settings when the present settings of the at least one network element differ from its settings according to the configuration plan.

20. A system according to claim 19, wherein the proxy unit adjunct computer further comprises:

an updating unit configured to update the network element settings using said management operations.

21. An apparatus, comprising:

a processor configured to manage apparatus settings received over a telecommunication network from a centralized network management element, the network management element being separate from said apparatus, determine and perform, based on the received settings the operations needed to change the apparatus settings to conform to the received settings, compare the settings according to the plan with present settings of the at least one network element, and generate management operations to update the apparatus settings to conform to the configuration plan containing settings when the present settings of the at least one apparatus differ from its settings according to the configuration plan.

22. An apparatus according to claim 21, wherein the apparatus is further configured to:

load information on the present settings of said apparatus;

receive information on the settings of said apparatus from the network management system; and update the apparatus settings using said management operations.

23. An apparatus, comprising:

storing means from which the apparatus configuration may be fetched and from which data is read;

managing means for managing network element settings from a centralized network management element in a communications system comprising at least said apparatus and a network management system separate from the apparatus, wherein the communication between the network management system and the apparatus is performed over a telecommunication network; and proxy means for configuring the apparatus, wherein the proxy means is configured to determine and perform, based on a configuration plan containing settings for the apparatus provided by the network management system, the operations needed to change the apparatus settings to conform to the configuration plan containing settings, wherein the proxy means further comprises comparing means for comparing the settings according to the configuration plan of the apparatus with its present settings, and generating means for generating management operations to update the apparatus settings to conform to the configuration plan containing settings when the present settings of the apparatus differ from its settings according to the configuration plan.

24. An apparatus according to claim 23, wherein the proxy means comprises:

downloading means for downloading information on the present settings of said apparatus;

receiving means for receiving information on the settings of said apparatus from the network management system;

updating means for updating the apparatus settings using said management operations.

25. An apparatus, comprising:

a managing unit configured to manage network element settings from a centralized network management element in a communications system comprising at least said apparatus and a network management system separate from said apparatus wherein the communication between the network management system and the network element is performed over a telecommunications network; and a proxy unit adjunct computer provided for the apparatus, wherein the proxy unit adjunct computer is configured to determine and perform, based on a configuration plan for the apparatus provided by the network management system, the operations needed to change the apparatus settings to conform to the configuration plan containing settings, wherein the proxy unit further comprises a comparing unit configured to compare the settings according to the configuration plan of the apparatus with its present settings, and a generating unit configured to generate management operations to update the apparatus settings to conform to the configuration plan containing settings when the present settings of the apparatus differ from its settings according to the configuration plan, and wherein the proxy unit is part of the apparatus to be managed.

26. An apparatus according to claim 25, wherein the proxy unit comprises:

a downloading unit configured to load information on the present settings of said apparatus, a receiving unit configured to receive information on the settings of said apparatus from the network management system, and an updating unit configured to update the apparatus settings using said management operations.

* * * * *